Dec. 8, 1931.  F. D. CHAPMAN  1,835,634
METHOD OF AND MEANS FOR QUALITY GRAVITY SEPARATING
Filed Jan. 21, 1929   2 Sheets-Sheet 1
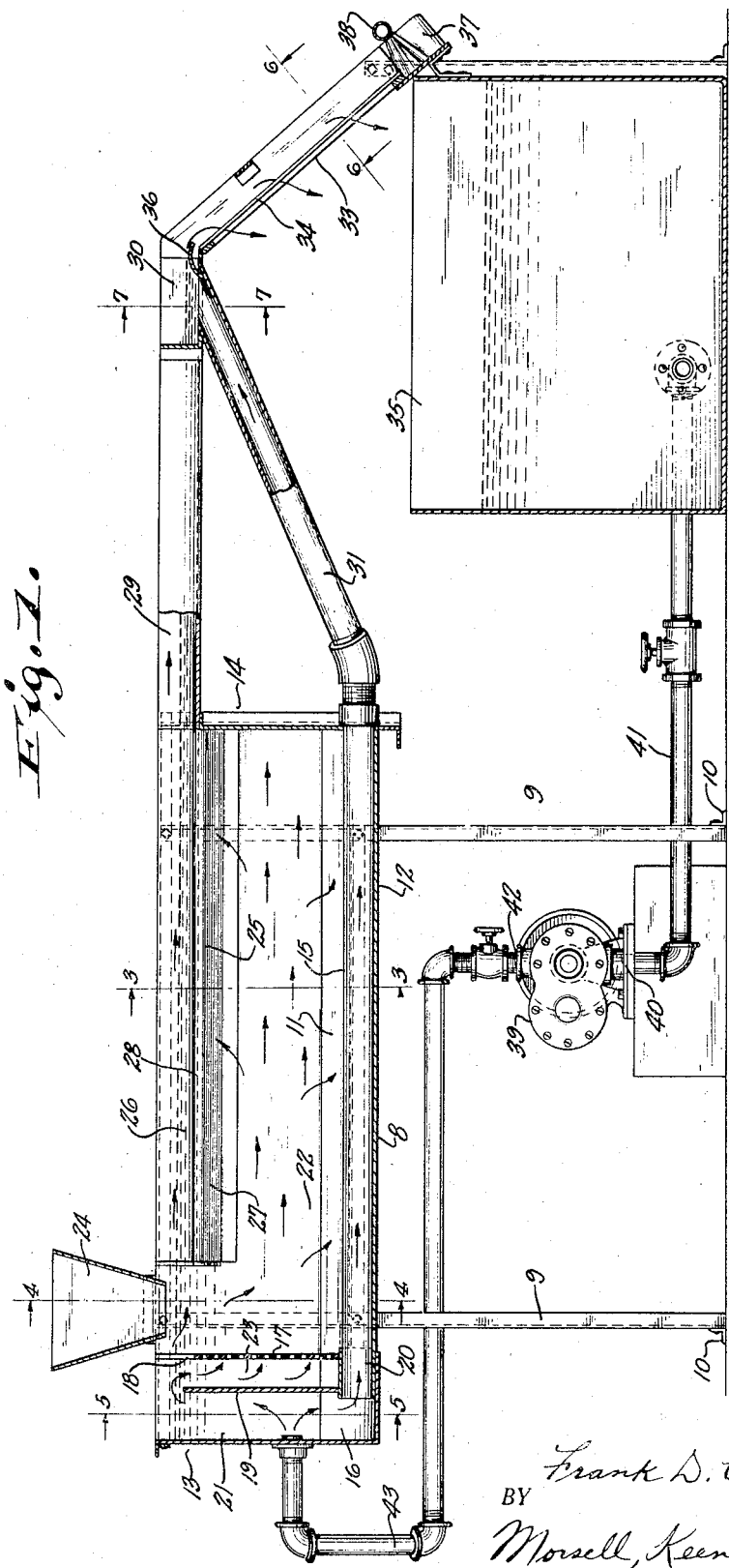
INVENTOR.
Frank D. Chapman.
BY Morsell, Keeney + Morsell,
ATTORNEYS.

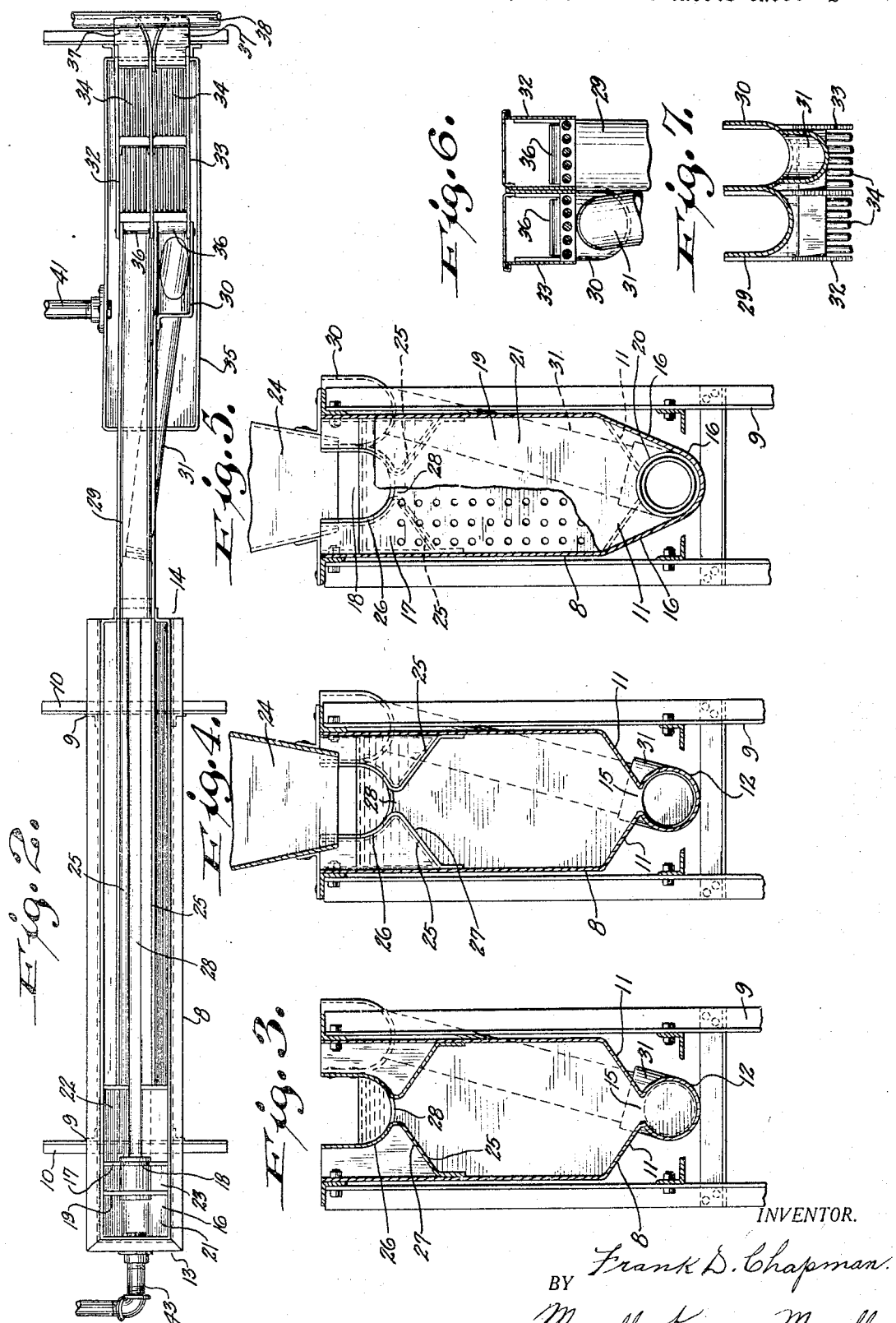

Patented Dec. 8, 1931

1,835,634

UNITED STATES PATENT OFFICE

FRANK D. CHAPMAN, OF BERLIN, WISCONSIN

METHOD OF AND MEANS FOR QUALITY GRAVITY SEPARATING

Application filed January 21, 1929. Serial No. 334,001.

This invention relates to improvements in method of and means for quality gravity separating peas, lima beans and other vegetables of the leguminous or seed pod family.

It is one of the objects of the present invention to provide a method of and means for quality gravity separating in which good quality peas are separated from poorer quality ones in floating through a tank containing brine.

A further object of the invention is to provide a method of and means for quality gravity separating in which two currents of brine, one relatively fast, are used for separating good quality peas from the poorer quality.

A further object of the invention is to provide a method of and means for quality gravity separating, in which the same brine is used over and over again.

A further object of the invention is to provide a method of and means for quality gravity separating, which is easily carried out and is of simple construction, is strong and durable and is well adapted for the purpose described.

With the above and other objects in view the invention consists of the improved method of and means for quality gravity separating and its parts and combinations as set forth in the claims, and all equivalents thereof:

In the accompanying drawings in which the same reference characters indicate the same parts in all of the views:

Fig. 1 is a longitudinal sectional view of the improved quality gravity separator used in carrying out the method, parts broken away to show interior construction;

Fig. 2 is a top view thereof with the feeding hopper removed to show parts thereb3neath;

Fig. 3 is a vertical transverse sectional view, on a larger scale taken on line 3—3 of Fig. 1;

Fig. 4 is a similar view taken on line 4—4 of Fig. 1;

Fig. 5 is a similar view taken on line 5—5 of Fig. 1;

Fig. 6 is a sectional detail view on a larger scale taken on line 6—6 of Fig. 1; and Fig. 7 is a similar view on a larger scale taken on line 7—7 of Fig. 1.

Referring to the drawings the reference numeral 8 indicates a tank which is supported upon legs 9 and transverse base members 10 in a somewhat elevated position. The tank is of rectangular form and the bottom portions on opposite sides incline downwardly, inwardly as indicated by the numeral 11 and terminate in a tubular form 12 which extends from a point a short distance from the charging end 13 of the tank to the discharging end 14 thereof. The tubular portion 12 at its junction with the inclined walls forms an elongated narrow opening 15 from the tank proper to the tubular portion thereof as clearly shown in Figs. 3 and 4, to separate the vegetable particles before they enter the tubular portion. The front end portion of the tank forward of the tubular portion is formed with lower inclined walls 16 which are joined together in a rounded formation similar to the lower portion of the tubular part 12 as shown in Fig. 5. A perforated partition 17 extends transversely across the tank adjacent the junction of the inclined parts 11 and 16 and is formed with a central upper edge opening 18. Another partition 19 of imperforate material extends transversely of the tank in front of and spaced from the perforated partition 17. A tube 20 forming a continuation of the tubular portion 12 extends through both partitions 17 and 19 to open communication between the inlet chamber 21 and the separating chamber 22 and to pass through the retarding chamber 23 without opening communication into said chamber 23.

A hopper 24 mounted on the upper portion of the tank adjacent the partition 17 is adapted to drop the peas to be separated into the separating chamber 22. The upper portion of the tank between the hopper and the discharge end of the tank is provided with longitudinal extending side walls which are angled and curved transversely towards each other to form side ribs of trough like form 25, having upper curved portions 26 and lower angular portions 27. The inner edge portions of the ribs are in horizontal alinement with each other and form a space 28 therebetween which is approximately the same as the space 15 between the upper portions of the tubular part 12. These spaces are of sufficient width to permit the free passage of peas, beans, and so forth therethrough when separated from each other to prevent good peas carrying up poorer ones.

A trough 29 forming a continuation or extension of the curved trough like ribs 26 projects rearwardly from the rear or discharge end of the tank and at its outer end is positioned alongside of a short trough section 30 which is of similar shape as the trough 29. A tube 31 connected to the outlet end portion of the tank adjacent the end of the tubular part 12 extends upwardly therefrom at an angle and at its upper end is connected to the bottom part of the short trough section 30.

Downwardly inclined trough extensions 32 and 33 having bottom portions formed of spaced slats or bars 34 are connected to the outer end portions of the troughs 29 and 30 to receive the peas or beans, and so forth from the troughs while the brine, by means of which they are separated, is discharged between the slats and into a container 35 positioned beneath the trough extensions.

Sheet metal obstructions or dams 36 are fastened at one end to the troughs adjacent their connection with the extension troughs and may be adjusted by bending upwardly or downwardly to maintain a predetermined height of brine in the tank and troughs.

The lower end portions of the inclined troughs are provided with curved deflectors 37 for discharging the separated peas, beans and so forth from opposite sides of the combined discharge ends of the inclined troughs.

A transversely extending perforated pipe 38 is provided for spraying the peas, beans, and so forth, as they are discharged from the troughs to wash the brine therefrom.

A pump 39 positioned alongside of the tank 8 has its inlet opening 40 connected to the lower portion of the container 35 by a valved pipe 41, and the outlet opening 42 of said pump is connected to the inlet chamber 21 of the tank 8, medially of its height, by a valved pipe 43.

In operation the tank 8 is filled with brine to the level indicated in Fig. 1. The receptacle 35 is also similarly filled and the pump is then started to circulate the brine from the receptacle to the tank and through the tank to the inclined troughs where it will be discharged into the receptacle. In passing through the tank the brine will enter the inlet chamber 21 and strike against the partition 19 and a part of the brine will flow over the partition 19 and will pass through the opening 18 of the perforated partition 17 and between the longitudinally extending side walls 26 to the trough 29 and the inclined trough 32, and thus return to the receptacle 35. As this flow is retarded by the partition or dam 19 it will move more slowly than other portions. Another portion of the brine will take the most direct path and will flow downwardly in the chamber 21 and through the tube 20 and the tubular part 12 and up the tube 31 to the trough 30 and then down and through the trough 33 to the receptacle 35. This lower portion of the flow due to the head of liquid produced by the dam 19 may flow faster than the upper stream mentioned, but if the dam 19 be of less height the speed ratios may be changed. Variations in relative speed between the two stratas of liquid may be changed by adjusting the relative height of the dams 36. A portion of the upper stream which flows over the partition 19 and into the retarding chamber 23 passes through the perforations of the partition 17 and through the tank between the upper slow stream and the lower faster stream and at the discharge end part of the intermediate stream will flow upwardly and part downwardly and join the other streams and be discharged therewith. The intermediate stream will be retarded by the perforated partition and flow at a slower rate of speed than the other two streams.

When thus operating, the peas, for instance, are poured into the hopper 24 and will drop therefrom into the flowing brine and the good peas, which are of lighter specific gravity than the brine will quickly float to the surface between the angular side walls 26 of the tank. The upper slow flowing stratum of brine flowing between the angular side walls 26 will carry the good peas through the trough 29 and down the inclined trough 32 where the brine will flow between the slats 34 and drop into the receptacle 35. The peas in the inclined trough will roll or slide downwardly and be discharged laterally from the lower end of the said trough.

The poorer peas in the tank which are of greater specific gravity than the brine will drop downwardly through the intermediate stratum of slower flowing brine and into the tubular portion 12 of the tank through which the brine more rapidly flows. This stratum of brine will carry the poorer peas through the tube 31 to troughs 30 and 33 and the brine and the poorer peas will be discharged therefrom in the same manner as before described.

The peas, in dropping into the tank, will enter the intermediate stratum of slow moving brine and have a chance to float upwardly or drop downwardly, and poor peas, which are in a state of equilibrium, will absorb sufficient of the brine to drop in the lower stratum and be discharged with the other poorer peas. As the peas separated as to quality are discharged from the lower end portions of the inclined troughs they will be subjected to sprays of fresh water to wash the brine therefrom.

From the foregoing description it will be seen that the method of and means for quality gravity separating leguminous seed vegetables is very simple and the construction shown is well adapted for the purpose described.

What I claim as my invention is:

1. A quality gravity separator, comprising a tank containing a liquid, the upper and lower portions of the tank being constricted relative to the intermediate portion, a duct extending outwardly and downwardly from the upper portion of the tank, a duct extending upwardly, outwardly and downwardly from a lower portion of the tank, means for feeding leguminous seed vegetables at one end of the tank, and means for causing the liquid to flow through the tank in different parallel speed stratas flowing in the same direction and to discharge therefrom through the ducts, said liquid flowing slower through said intermediate portion than through said upper and lower portions to separate the better quality leguminous seeds from the poorer quality by specific gravity and causing the separated leguminous seeds to travel in different stratas to the ducts and through the ducts and to be discharged from the outer lower end portions thereof, the liquid in passing through the downwardly extending portions of the ducts being separated from the leguminous seeds.

2. A quality gravity separator, comprising a tank containing a liquid, the upper and lower portions of the tank being constricted relative to the intermediate portion, a duct extending outwardly and downwardly from the upper portion of the tank, a duct extending upwardly, outwardly and downwardly from a lower portion of the tank, means for feeding edible leguminous seed vegetables into the liquid at one end of the tank, means for causing the liquid to flow through the tank in different parallel speed stratas flowing in the same direction and to discharge therefrom through the ducts, said liquid flowing slower through said intermediate portion than through said upper and lower portions to separate the good quality leguminous seeds from the poorer quality by specific gravity and causing the separated leguminous seeds to travel in different stratas to the ducts and through the ducts and to be discharged from the outer lower end portions thereof, the liquid in passing through the downwardly extending portions of the ducts being separated from the leguminous seeds, and means for washing the liquid from the leguminous seeds while the leguminous seeds are being discharged from the ducts.

3. A quality gravity separator, comprising a tank of elongated form having an inlet chamber, a retarding chamber and a separating chamber, the lower portion of the separating chamber being of tubular formation to provide a restricted opening thereto while a part of the upper portion of said chamber is provided with inwardly projecting ribs to form an elongated restricted opening therebetween, a duct extending outwardly and downwardly from the ribs of the tank, a duct extending upwardly and downwardly from the tubular formation of the tank, a brine receptacle positioned adjacent the ducts, means for moving the brine from the receptacle to the inlet and retarding chambers and through the tank in different speed stratas to the ducts and back to the receptacle, and means for feeding edible leguminous seed vegetables into one end portion of the tank.

4. A quality gravity separator, comprising a tank having an upper and a lower discharge duct, inclined perforated duct portions connected to the discharge ducts, said tank having an inlet chamber, a retarding chamber and a separating chamber, the partition between the retarding and the separating chamber being perforated, a tubular connection between the inlet and the separating chambers, means for feeding leguminous seed vegetables into the separating chamber, a brine receptacle, and a pump means for moving the brine from the receptacle to the tank chambers and through the separating chamber in three parallel speed stratas flowing in the same direction, of which the upper stratum flows at a different speed than the lower stratum and the intermediate stratum flows at a less speed than the upper and lower strata, the leguminous seeds being separated as to their quality by specific gravity and the different speed stratas of the brine and discharged from the inclined ducts while the brine is discharged through the perforated duct portions and into the receptacle.

5. A quality gravity separator, comprising a tank of elongated form having partitions to form an inlet chamber, a retarding chamber and a separating chamber, the partition between the retarding and the separating chambers being perforated, the lower portion of the separating chamber being of tubular formation and having a restricted opening to the other portion, said tubular portion having an outlet and a tube extending through the retarding chamber and into the inlet chamber, a part of the upper portion of said separating chamber having an outlet and inwardly projecting ribs to form a restricted opening therebetween, a duct connected to the upper outlet and extending outwardly therefrom, a duct connected to the lower outlet and extending upwardly therefrom, downwardly inclined perforated ducts forming continuations of the other ducts, a brine receptacle for receiving brine from the perforated ducts, pump means for moving the brine from the receptacle to the inlet and retarding chambers and through the separating chamber in different parallel speed stratas flowing in the same direction and to the outlets and through the ducts and into the receptacle, and a hopper for feeding edible leguminous seed vegetables into one end portion of the separating chamber, the leguminous seeds being separated as to their quality by specific gravity and the different speed stratas of the brine and carried by the brine to the inclined perforated ducts and separably discharged therefrom.

6. A quality gravity separator, comprising a tank of elongated form having partitions to form an inlet chamber, a retarding chamber and a separating chamber, the partition between the retarding and the separating chambers being perforated to permit brine to flow therethrough, the lower portion of the separating chamber being of tubular formation and having a restricted opening to the other portion, said tubular portion having an outlet and a tube extending through the retarding chamber and into the inlet chamber to permit a stratum of brine to flow rapidly therethrough, a part of the upper portion of said separating chamber having an outlet and inwardly projecting ribs to form a restricted opening therebetween to separate different stratas of moving brine, a duct connected to the upper outlet and extending outwardly therefrom, a duct connected to the lower outlet and extending upwardly therefrom, downwardly inclined perforated discharge ducts forming continuations of the other ducts, a brine receptacle for receiving brine from the perforated ducts, pump means for moving the brine from the receptacle to the inlet and retarding chambers and through the separating chamber in different parallel stratas flowing in the same direction, and to the outlets and through the ducts and into the receptacle, dams carried by the ducts for maintaining a predetermined level of brine in the tank, and a hopper between the perforated partition and the inwardly projecting ribs for feeding edible leguminous seed vegetables into the separating chamber, the leguminous seeds being separated as to their quality by specific gravity and the different speed stratas of the brine and carried by the brine to the inclined perforated ducts and separably discharged therefrom.

7. A quality gravity separator, comprising a tank containing a liquid flowing in different horizontal stratas at different speeds and in the same direction for separating leguminous seed vegetables by specific gravity, a pair of inclined ducts connected to the tank and through which the liquid and the quality separated leguminous seeds are discharged, and a dam means for adjustably maintaining the height of the liquid in the tank and for slowing the relative rate of flow of the upper stratum of liquid.

8. A quality gravity separator, comprising a tank containing a liquid flowing in different horizontal stratas at different speeds and in the same direction for separating leguminous seed vegetables by specific gravity, a pair of inclined ducts connected to the tank and through which the liquid and the quality separated leguminous seeds are discharged, and a dam means in each duct for adjustably maintaining the height of liquid in the tank and for controlling the discharge of liquid and separated leguminous seeds from the tank, said dam also slowing the relative rate of flow of the upper stratum of liquid.

9. The method of grading peas or the like, which comprises, producing three superimposed horizontal streams of liquid flowing in the same direction and in vertically open communication with each other, introducing peas of mixed quality into the intermediate of said streams and maintaining the same therein for a sufficient length of time to permit rising of the floatable peas into the upper stream and sinking of the others into the lower stream, and subsequently removing the separated grades from the upper and lower streams respectively.

10. The method of grading peas or the like, which comprises, producing three superimposed horizontal streams of liquid flowing in the same direction and in vertically open communication with each other, the intermediate of said streams being of greater transverse cross-section than the others and the lower of said streams having higher velocity than said intermediate stream, introducing peas of mixed quality into said intermediate stream and maintaining the same therein for a sufficient length of time to permit rising of the floatable peas into the upper stream and sinking of the others into the lower stream, and subsequently removing the separated grades from the upper and lower streams respectively.

11. The method of grading peas or the like, which comprises, producing three superimposed horizontal streams of liquid flowing in the same direction and in vertically open communication with each other, the velocity of the lower of said streams being higher than that of the others, introducing peas of mixed quality into the intermediate of said streams and maintaining the same therein for a sufficient length of time to permit rising of the floatable peas into the upper stream and sinking of the others into the lower stream, and subsequently elevating the lower of said streams to approximately the height of the upper stream and removing the separated grades from the upper and the elevated lower stream respectively.

12. The method of grading peas or the like, which comprises, producing three superimposed horizontal streams of liquid flowing in the same direction and in vertically open communication with each other, introducing peas of mixed quality into the intermediate of said streams and maintaining the same therein for a sufficient length of time to permit rising of the floatable peas into the upper stream and sinking of the others into the lower stream, selectively causing the balanced peas at the discharge end of said intermediate stream to pass into either said upper or said lower stream, and subsequently removing the separated grades from the upper and lower streams respectively.

13. The method of grading peas or the like, which comprises, producing three superimposed horizontal streams of liquid flowing in the same direction and in vertically open communication with each other, the intermediate of said streams being of greater transverse cross-section than the others and the lower of said streams having higher velocity than said intermediate stream, introducing peas of mixed quality into said intermediate stream and maintaining the same therein for a sufficient length of time to permit rising of the floatable peas into the upper stream and sinking of the others into the lower stream, selectively causing the balanced peas at the discharge end of said intermediate stream to pass into either said upper or said lower stream, and subsequently removing the separated grades from the upper and lower streams respectively.

14. The method of grading peas or the like, which comprises, producing three superimposed horizontal streams of liquid flowing in the same direction and in vertically open communication with each other, the velocity of the lower of said streams being higher than that of the others, introducing peas of mixed quality into the intermediate of said streams and maintaining the same therein for a sufficient length of time to permit rising of the floatable peas into the upper stream and sinking of the others into the lower stream, and varying the elevation of the delivery end of one of said streams to selectively cause the balanced peas at the discharge end of said intermediate stream to pass into either said upper or said lower stream.

15. A quality grader comprising, a tank forming three superimposed horizontal liquid conducting conduits the intermediate of which has greater transverse cross-section than the others, said conduits being in vertically open communication with each other, means for introducing liquid into the corresponding ends of all of said conduits, means for introducing leguminous seed of mixed quality into the liquid admission ends of said conduits, and means for removing the separated grades of said seed from the opposite ends of said upper and lower conduits.

16. A quality grader comprising, a tank forming three superimposed horizontal liquid conducting conduits the intermediate of which has greater transverse cross-section than the others, said conduits being in vertically open communication with each other, means for introducing liquid into the corresponding ends of all of said conduits, means for introducing leguminous seed of mixed quality into the liquid admission ends of said conduits, means for removing the separated grades of said seed from the opposite ends of said upper and lower conduits, and means for selectively causing the balanced seed at the discharge end of said intermediate conduit to be removed with the discharge from either said upper or said lower conduit.

17. A quality grader comprising, a tank forming three superimposed horizontal liquid conducting conduits all of which have substantially uniform cross-section throughout their length and the intermediate of which has greater transverse cross-section than the others, said conduits being in vertically open communication with each other throughout their entire lengths, means for introducing liquid into the corresponding ends of all of said conduits, means for introducing leguminous seed of mixed quality into the liquid admission ends of said conduits, and means for removing the separated grades of said seed together with liquid from the opposite ends of said upper and lower conduits only.

18. A quality grader comprising, a tank forming three superimposed horizontal liquid conducting conduits all of which have substantially uniform cross-section throughout their length and the intermediate of which has greater transverse cross-section than the others, said conduits being in vertically open communication with each other throughout their entire lengths, means for introducing liquid into the corresponding ends of all of said conduits, means for introducing leguminous seed of mixed quality into the liquid admission ends of said conduits, means for removing the separated grades of said seed together with liquid from the opposite ends of said upper and lower conduits only, and means for selectively causing the balanced seed at the discharge end of said intermediate conduit to be removed with the discharge from either said upper or said lower conduit.

In testimony whereof, I affix my signature.

FRANK D. CHAPMAN.